April 20, 1965  R. A. CRUMBLISS  3,179,887
AUTOMOTIVE STARTER TESTING APPARATUS UTILIZING
REGULATOR CONTROLLED FEEDBACK
Filed Jan. 11, 1960
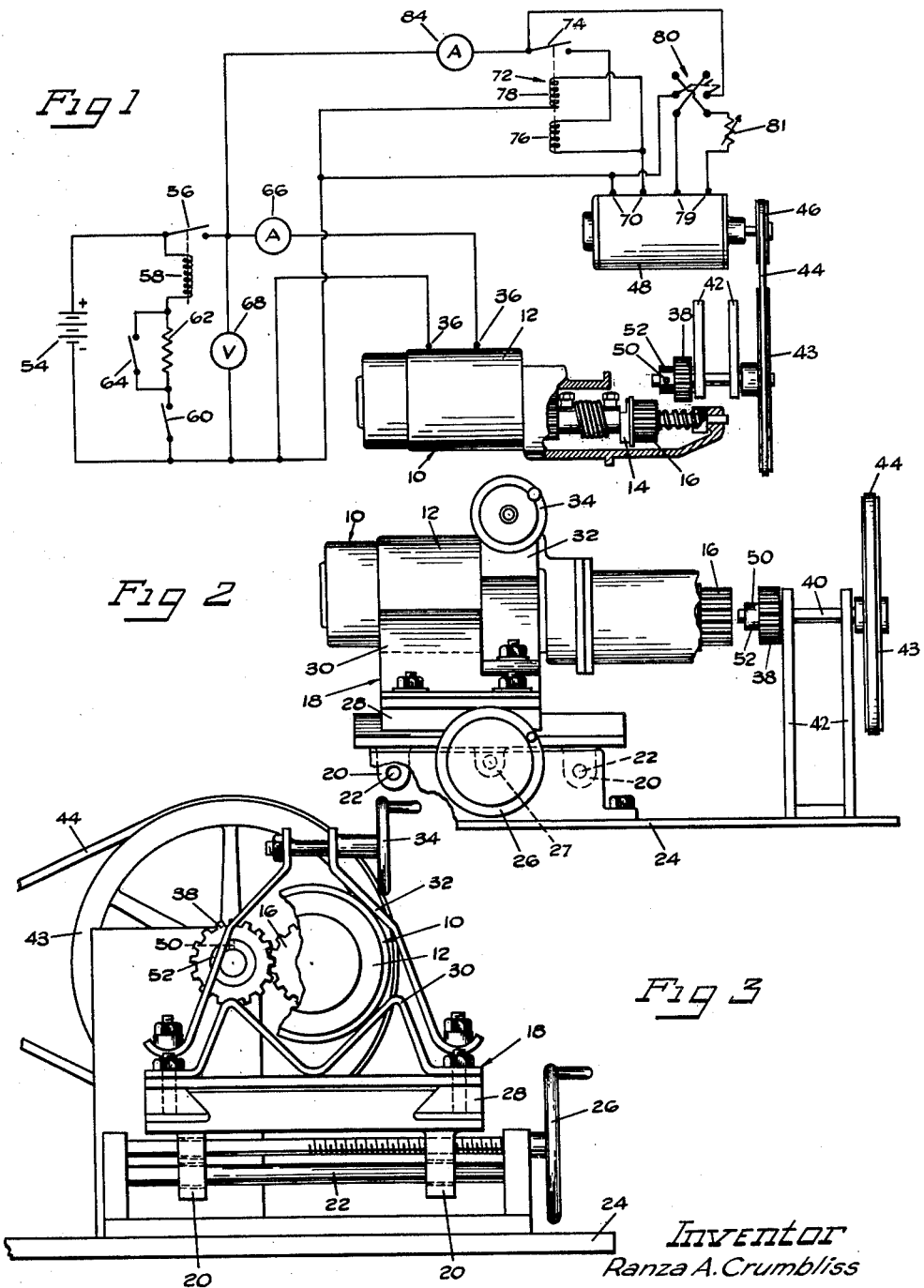
*Inventor*
Ranza A. Crumbliss

United States Patent Office 3,179,887
Patented Apr. 20, 1965

3,179,887
AUTOMOTIVE STARTER TESTING APPARATUS UTILIZING REGULATOR CONTROLLED FEED-BACK
Ranza A. Crumbliss, 107 W. Woodland, Bensenville, Ill.
Filed Jan. 11, 1960, Ser. No. 1,715
4 Claims. (Cl. 324—158)

The present invention relates to automotive testing apparatus and method and more particularly to an improved apparatus and method for testing starters for automotive vehicles.

Oftentimes, starters for automotive vehicles operate when power is applied thereto, but if a load is applied to the starter the starter motor will stop or draw excessive current. Accordingly, it is difficult to determine the condition of a starter by merely assuring that the shaft of the starter rotates.

Starters have been tested under load by applying a well known prony brake to the shaft of the starter. However, it is difficult and time consuming to adjust the load applied by a prony brake. Moreover, prony brakes are inefficient since the electrical power employed in driving the starter is wasted. Accordingly, a test apparatus employing prony brakes is expensive to operate.

An object of the present invention is the provision of an improved method and apparatus for testing a starter for an automotive vehicle. Another object of the invention is the provision of an apparatus for testing a starter for an automotive vehicle which apparatus is relatively simple to operate and economical to use. Still another object is the provision of an apparatus for testing a starter for an automotive vehicle which apparatus is relatively inexpensive to manufacture and durable in use.

Other objects and advantages of the present invention will become apparent by reference to the following description and accompanying drawings.

In the drawings:

FIGURE 1 is a schematic circuit diagram of a testing apparatus for a starter showing various features of the present invention.

FIGURE 2 is a fragmentary front elevational view of a testing apparatus for a starter showing various features of the present invention; and FIGURE 3 is an enlarged, fragmentary side view of the testing apparatus shown in FIGURE 2.

A method in accordance with the present invention is employed to test a starter for an automotive vehicle. The method comprises connecting a source of power to a starter to be tested, connecting the shaft of the starter in driving relationship with the shaft of a generator, and measuring the input current to the starter.

For purposes of explanation, the method is described in connection with the apparatus illustrated for accomplishing the principles of the invention. The illustrated apparatus is employed to test a conventional starter 10 for an automobile. The starter 10 includes a motor 12 and a Bendix drive 14 of the outboard type connected to the motor 12. As is well known, when the motor begins to rotate, a pinion 16 in the Bendix drive 14 shifts away from the motor 12.

As shown in FIGURES 2 and 3, the starter 10 is horizontally supported by a carriage 18 so that the starter 10 is movable longitudinally and transversely of its shaft to compensate for the different shapes and sizes of starters employed in modern day automotive vehicles. The carriage 18 is slidably mounted by means of downwardly extending sliders 20 to a pair of laterally extending spaced apart rails 22 which are suitably mounted to a frame 24. The carriage 18 is moved along the rails 22 by a hand operated laterally extending traversing screw 26. The traversing screw 26 is rotatably mounted to the frame 24 and is threadedly engaged with a downwardly extending projection 27 on the carriage 18.

As illustrated, the cariage 18 includes a double V-bed 28 with set screw adjustment which allows longitudinal movement of the starter 10. A V-shaped saddle 30 is suitably mounted to the bed 28. The starter 10 is secured on the saddle 30 by a two piece clamp 32 suitably mounted to the bed 28, the clamp 32 being tightened about the starter 10 by a hand operated screw 34.

As shown in the drawings, the starter 10 is positioned so that when electrical power is applied to a pair of electrical terminals 36 which are connected to the starter motor 12, the pinion 16 shifts to engage an idler gear 38 connected to one end of a longitudinally extending idler shaft 40. The shaft 40 is journalled in a pair of spaced apart bearings 42 suitably mounted to the frame 24. The other end of the shaft 40 is provided with an idler pulley wheel 43 which is connected by a pulley belt 44 to a drive pulley wheel 46, disposed on the shaft of a generator 48. The generator 48 is suitably mounted to the frame 24.

As is well known, conventional starters have different sized pinions. Accordingly, the idler gear 38 is preferably connected to the idler shaft 40 with a releasable connection, such as a set screw 50 extending through a collar 52 integrally connected to the idler gear 38, so that idler gears may be readily exchanged.

As shown in FIGURE 1, electrical power is supplied to the starter motor 12 by connecting a battery 54 through a normally open contact 56 of a relay 58 to the electrical terminals 36 of the starter 10. The relay 58 is actuated by closing a normally open on-off switch 60 which is connected in series with the relay 58, and the series combination is connected across the battery 54. A dropping resistor 62 is also provided in series with the relay 58 to permit the same relay to be employed with a 12 volt battery or a 6 volt battery. When a 6 volt battery 54 is employed to operate a 6 volt starter, a normally open switch 64, which is connected in parallel with the dropping resistor 62, is closed to short out the dropping resistor 62.

An ammeter 66 is connected between the relay contact 56 and the starter 10 to measure the input current to the starter 10. A voltmeter 68 is connected in parallel with the ammeter 66 and the starter 10 in order to measure the voltage being applied thereto.

In the illustrated embodiment, a pair of terminals 70 which are connected internally to the armature of the generator 48, are connected in parallel with the battery 54 and relay contact 56 (i.e. the positive armature terminal 70 is connected to the starter side of the relay contact 56 and the negative armature terminal 70 is connected to the negative side of the battery 54). Accordingly, the output current from the generator 48 is employed to provide a portion of the current drawn by the starter 10. In this way, a minimum of electrical energy is wasted in testing a starter.

Since it is undesirable for the battery 54 to cause current to flow to the generator 48, a regulator 72 is connected in the output circuit of the generator 48. In the illustrated embodiment, a normally open contact 74 and a current coil 76 of the regulator 72 are connected in series between the armature terminals 70 of the generator 48 and the starter side of the relay contact 74. The contact 74 is closed by the energization of a voltage coil 78 of the regulator 72, which voltage coil 78 is connected across the armature terminals 70 of the generator 48.

Once the contact 74 closes, the current flowing through the current coil 76 maintains the contact 74 closed until the generator voltage decreases to a value where there is a reversal in current through the current coil 76. The reversal of current causes the contact 74 to open.

Since conventional starters rotate in different directions, and the polarity of the output of the generator 48 depends upon the direction of rotation of the generator shaft, the field coil terminals 79 are connected through a reversing switch 80 to the battery side of the regulator contact 74. In this way the field coil is energized by the battery 54 and the field coil's polarity can be readily charged if the generator's rotation is wrong, to provide the proper polarity on the output of the generator 48.

The output current from the generator 48 and thus the load on the starter 10 afforded by the generator 48, is varied by a rheostat 81 connected in series with the field coil of the generator 48. As illustrated, the rheostat 81 is connected between one of the field coil terminals 79 and one pole of the reversing switch 80. The output current is measured by an ammeter 84 connected into the generator output circuit between the regulator contact 74 and the connection to the starter side of the relay contact 56.

In operation, the starter 10 is clamped on the carriage 18 so that the Bendix drive pinion 16 is in position to engage the idler gear 38. The terminals 36 on the starter motor 12 are then connected to the battery circuit. The on-off switch 60 is closed and current is, therefore, supplied to the starter motor 12. The starter motor 12 begins to rotate, the Bendix drive shifts and the idler pulley wheel 43 is rotated which, in turn, rotates the generator 48. As the speed of the generator 48 increases it develops sufficient voltage to close the regulator contact 74, and thereby allows the current from the generator 48 to flow to the starter motor 12. The condition of the starter may be then determined by reading the starter ammeter 66, and the generator ammeter 84 and comparing the readings. The load on the starter may be varied as desired by adjusting the field rheostat 81.

In one embodiment of the test apparatus, the generator was adjusted for 20 amps. At this load, a 6 volt starter in good condition draws approximately 200 amps. A greater current than this would show that the starter is not functioning properly.

From the above it can be seen that a testing apparatus and method are provided which are easily adaptable to conventional starters employed in automotive vehicles. Moreover, the testing apparatus and method employ energy developed by the starter as part of the energy necessary to power the starter. Also by utilizing the testing apparatus and method, the condition of a starter may be determined accurately by an operator having little or no experience.

Various changes and modifications may be made in the above described testing apparatus and method without deviating from the spirit or scope of this invention. Various features of the invention are set forth in the accompanying claims.

I claim:

1. An apparatus for testing a starter for automotive vehicles under operating conditions, which starter includes a shaft and a gear rotatable by the shaft, said apparatus comprising a frame, means for connecting a source of electrical power to the starter to be tested, a generator fixedly mounted on said frame and having a shaft, a resistance load, means for coupling the output current of said generator to said resistance load, a gear rotatably mounted on said frame, means for coupling said gear in driving relationship with said generator shaft, mounting means on said frame located to position the starter gear in driving relationship with said rotatably mounted gear when the starter is activated, a regulator electrically connected between said generator and said starter whereby the electrical output of said generator may be connected to the input of said starter, means for determining the input current to the starter, and means for determining the output current of said generator.

2. Apparatus for testing a starter for an automotive vehicle under operating conditions which starter includes a pinion gear rotated by the shaft of the starter when the starter is activated, said apparatus comprising a frame, an ammeter on said frame, means for connecting said ammeter and the starter to be tested in series, means for connecting a source of electrical power to the series connection of said ammeter and the starter, a generator having a field fixedly mounted on said frame and having a shaft and output terminals, a variable resistance load, means for coupling the output current of said generator to said resistance load, a reversing switch connected to said field, an idler gear rotatably mounted on said frame, means coupling said idler gear in driving relationship with the shaft of said generator, a mounting carriage on said frame located to position the pinion gear in driving relation to said idler gear when the starter is activated, a regulator electrically connected between said generator and said starter whereby the electrical output of said generator may be connected to the input of said starter, means for connecting the output terminals of the generator in parallel with the series connection of said ammeter and the starter, and a second ammeter connected in series with the output terminals of said generator.

3. Apparatus for testing a starter for an automotive vehicle under operating conditions, which starter includes a pinion gear rotated by the shaft of the starter when the starter is activated, said apparatus comprising a frame, an ammeter on said frame, means for connecting said ammeter, and the starter to be tested in series, means for connecting a source of power to the series connection of said ammeter and the starter, a generator having a field fixedly mounted on said frame and having a shaft and output terminals, a variable resistance load, means for coupling the output current of said generator to said resistance load, a reversing switch connected to said field, a carriage on said frame for mounting said starter for axial and lateral movement, an idler shaft rotatably mounted on said frame, a removable idler gear coupled to said shaft, said carriage being located on said frame to position the pinion gear in driving relation to the idler gear when the starter is activated, means coupling said idler shaft in driving relationship with the shaft of said generator, a regulator electrically connected between said generator and said starter whereby the electrical output of said generator may be connected to the input of said starter, means for connecting the output terminals of said generator in parallel with the series connection of said ammeter and the starter, and a second ammeter connected in series with the output terminals of said generator.

4. Apparatus for testing a starter for an automotive vehicle under operating conditions, which starter includes a shiftable pinion gear which is rotated and shifted when the starter is activated, said apparatus comprising a frame, a switch on said frame, an ammeter on said frame, means connecting said switch, said ammeter and the starter in series, means for connecting the series connection of said switch, said ammeter and the starter to a source of electrical power, a generator fixedly mounted on said frame and having a shaft, output terminals and field coil terminals, means coupling said field coil terminals across said output terminals, a variable resistor connected in series with said field coil terminals, an idler shaft rotatably mounted on said frame, a removable idler gear on said idler shaft, means coupling said idler shaft in driving relationship with the shaft of said generator, a carriage on said frame located to position the pinion in driving relation to said removable idler gear when the starter is activated, a regulator coupled to the output terminals of the generator and operable by the output power of said generator for connecting the output terminals of said generator to the starter when the output voltage of said generator reaches a predetermined value, and a second ammeter connected in series with the output terminals of said generator.

(References on following page)

References Cited by the Examiner

UNITED STATES PATENTS

| | | | |
|---|---|---|---|
| 1,205,448 | 11/16 | Halbeib | 324—158 |
| 1,445,923 | 2/23 | Wilder | 324—158 |
| 2,442,649 | 6/48 | Haskins | 324—16 |
| 2,611,265 | 9/52 | Latowcelle | 324—16 X |
| 2,826,737 | 3/58 | Crumbliss | 324—158 X |

OTHER REFERENCES

"Direct Current Machinery" (Siskind), McGraw-Hill Book Co., New York, 1952, pp. 251–253.

WALTER L. CARLSON, *Primary Examiner.*

SAMUEL BERNSTEIN, LLOYD McCOLLUM,
*Examiners.*